(12) United States Patent
Caudle et al.

(10) Patent No.: US 8,524,185 B2
(45) Date of Patent: Sep. 3, 2013

(54) INTEGRATED SCR AND AMOX CATALYST SYSTEMS

(75) Inventors: Matthew Tyler Caudle, Hamilton, NJ (US); Martin Dieterle, Jersey City, NJ (US); Scott E. Buzby, Burlington Township, NJ (US)

(73) Assignee: BASF Corporation, Florham Park, NJ (US)

( * ) Notice: Subject to any disclaimer, the term of this patent is extended or adjusted under 35 U.S.C. 154(b) by 770 days.

(21) Appl. No.: 12/263,871

(22) Filed: Nov. 3, 2008

(65) Prior Publication Data

US 2010/0111796 A1    May 6, 2010

(51) Int. Cl.
*C01B 31/30* (2006.01)
*B01D 47/00* (2006.01)
*B01D 46/04* (2006.01)

(52) U.S. Cl.
USPC ....... 423/237; 423/210; 423/212; 423/243.12

(58) Field of Classification Search
None
See application file for complete search history.

(56) References Cited

U.S. PATENT DOCUMENTS

| | | | |
|---|---|---|---|
| 3,929,965 A | 12/1975 | Kim et al. | |
| 4,085,193 A | 4/1978 | Nakajima et al. | |
| 4,552,733 A | 11/1985 | Thompson et al. | |
| 5,024,981 A | 6/1991 | Speronello et al. | |
| 5,679,313 A | 10/1997 | Nojima | |
| 5,728,356 A | 3/1998 | Iida | |
| 5,891,409 A | 4/1999 | Hsiao et al. | |
| 6,080,376 A | 6/2000 | Iida et al. | |
| 6,133,185 A | 10/2000 | Kinugasa et al. | |
| 6,162,415 A | 12/2000 | Liu et al. | |

(Continued)

FOREIGN PATENT DOCUMENTS

| | | |
|---|---|---|
| CA | 2652837 | 12/2007 |
| EP | 0773057 A1 | 5/1997 |

(Continued)

OTHER PUBLICATIONS

"Extended European Search Report in EP09829666", dated Mar. 29, 2012, 9 pgs.

(Continued)

*Primary Examiner* — Melvin Curtis Mayes
*Assistant Examiner* — Sheng H Davis
(74) *Attorney, Agent, or Firm* — Melanie L. Brown

(57) ABSTRACT

Catalysts, methods of preparing catalyst, and methods for treating exhaust gas streams are described. In one or more embodiments, a catalyst system includes an upstream zone effective to catalyze the conversion of a mixture of $NO_x$ and $NH_3$ to $N_2$, and a downstream zone effective for the conversion of ammonia to $N_2$ in the presence or absence of $NO_x$. In an embodiment, a method for preparing a catalyst system includes: first coating one end of a substrate along at least 5% of its length with an undercoat washcoat layer containing a material composition effective to catalyze the removal of ammonia; second coating with an overcoat layer containing a material composition effective to catalyze the conversion of a mixture of $NO_x$ and $NH_3$ to $N_2$. A method for treating the exhaust gas stream is provided, which includes injecting ammonia or an ammonia precursor into an exhaust gas stream of a vehicle, passing the engine exhaust gas stream containing $NO_x$ and $NH_3$ through the upstream zone of a catalyst system to remove $NO_x$ and then passing the exhaust gas stream through the downstream zone of the catalyst system to remove $NH_3$, as well as other oxidizable species such as hydrocarbons and CO.

17 Claims, 10 Drawing Sheets

(56) References Cited

U.S. PATENT DOCUMENTS

| | | | |
|---|---|---|---|
| RE39,041 E | 3/2006 | Nojima et al. | |
| 7,062,904 B1 | 6/2006 | Hu et al. | |
| 7,143,578 B2 | 12/2006 | Kakwani et al. | |
| 7,222,597 B2 | 5/2007 | Auchter et al. | |
| 7,332,135 B2 | 2/2008 | Gandhi et al. | |
| 2006/0029534 A1 | 2/2006 | Eiteneer | |
| 2006/0039843 A1 | 2/2006 | Patchett et al. | |
| 2007/0110643 A1 | 5/2007 | Sobolevskiy et al. | |
| 2007/0180816 A1 | 8/2007 | Masuda et al. | |
| 2007/0286786 A1 | 12/2007 | Ikoma et al. | |
| 2008/0031793 A1 | 2/2008 | DiFrancesco et al. | |
| 2008/0202107 A1* | 8/2008 | Boorse et al. | 60/301 |
| 2008/0241060 A1* | 10/2008 | Li et al. | 423/700 |
| 2008/0256936 A1* | 10/2008 | Zuberi | 60/299 |
| 2008/0286184 A1* | 11/2008 | Ando et al. | 423/213.5 |
| 2010/0058746 A1 | 3/2010 | Pfeifer et al. | |

FOREIGN PATENT DOCUMENTS

| | | |
|---|---|---|
| EP | 1961933 | 8/2008 |
| EP | 1992409 | 11/2008 |
| JP | 20060289211 A | 10/2006 |
| WO | WO2004/096703 A2 | 11/2004 |
| WO | WO2006/029311 A1 | 3/2006 |
| WO | WO-2007/137675 | 12/2007 |
| WO | WO2008101585 * | 8/2008 |
| WO | WO-2008/106523 | 9/2008 |
| WO | WO-2008/118434 | 10/2008 |

OTHER PUBLICATIONS

JP 2006-289211A (NE CHEMCAT Corp) Oct. 26, 2006 See abstract, fig. 3—Machine Translation.

* cited by examiner

INTEGRATED SCR AND AMOX CATALYST SYSTEMS

TECHNICAL FIELD

The invention pertains to catalysts, methods for their manufacture, and methods of treating emissions in an exhaust stream.

BACKGROUND

Diesel engine exhaust is a heterogeneous mixture that contains particulate emissions such as soot and gaseous emissions such as carbon monoxide, unburned or partially burned hydrocarbons, and nitrogen oxides (collectively referred to as $NO_x$). Catalyst compositions, often disposed on one or more monolithic substrates, are placed in engine exhaust systems to convert certain or all of these exhaust components to innocuous compounds.

Ammonia selective catalytic reduction (SCR) is a $NO_x$ abatement technology that will be used to meet strict $NO_x$ emission targets in diesel and lean-burn engines. In the ammonia SCR process, $NO_x$ (normally consisting of $NO+NO_2$) is reacted with ammonia (or an ammonia precursor such as urea) to form dinitrogen ($N_2$) over a catalyst typically composed of base metals. This technology is capable of $NO_x$ conversions greater than 90% over a typical diesel driving cycle, and thus it represents one of the best approaches for achieving aggressive $NO_x$ abatement goals.

A characteristic feature of some ammonia SCR catalyst materials is a propensity to retain considerable amounts of ammonia on Lewis and Brønsted acidic sites on the catalyst surface during low temperature portions of a typical driving cycle. A subsequent increase in exhaust temperature can cause ammonia to desorb from the ammonia SCR catalyst surface and exit the exhaust pipe of the vehicle. Overdosing ammonia in order to increase $NO_x$ conversion rate is another potential scenario where ammonia may exit from the ammonia SCR catalyst.

Ammonia slip from the ammonia SCR catalyst presents a number of problems. The odor threshold for $NH_3$ is 20 ppm in air. Eye and throat irritation are noticeable above 100 ppm, skin irritation occurs above 400 ppm, and the IDLH is 500 ppm in air. $NH_3$ is caustic, especially in its aqueous form. Condensation of $NH_3$ and water in cooler regions of the exhaust line downstream of the exhaust catalysts will give a corrosive mixture.

Therefore, it is desirable to eliminate the ammonia before it can pass into the tailpipe. A selective ammonia oxidation (AMOx) catalyst is employed for this purpose, with the objective to convert the excess ammonia to $N_2$. It would be desirable to provide a catalyst for selective ammonia oxidation that is able to convert ammonia at a wide range of temperatures where ammonia slip occurs in the vehicles driving cycle, and can produce minimal nitrogen oxide byproducts. The AMOx catalyst should also produce minimal $N_2O$, which is a potent greenhouse gas.

SUMMARY

Aspects of the invention include catalyst systems for treating an exhaust gas stream, and methods of preparing catalysts for the treatment of such gas. As used herein, the term "catalyst system" shall include two or more chemical catalytic functions on one substrate or on more than one separate substrate.

According to one aspect of the invention, a catalyst system for treating an exhaust gas stream containing $NO_x$ comprises at least one monolithic catalyst substrate; an undercoat washcoat layer coated on one end of the monolithic substrate, and containing a material composition A effective for catalyzing $NH_3$ oxidation; and an overcoat washcoat layer coated over a length of the monolithic substrate sufficient to overlay at least a portion of the undercoat washcoat layer, and containing a material composition B effective to catalyze selective catalytic reduction (SCR) of $NO_x$.

In one embodiment, the substrate is a single monolithic substrate. The monolithic substrate can be a flow-through honeycomb substrate comprising a plurality of fine, substantially parallel gas flow passages extending along the longitudinal axis of the substrate.

In an embodiment, the undercoat washcoat layer covers in the range of about 5% and 100% of the total substrate length, and the overcoat washcoat layer covers in the range of about 5% and 100% of the total substrate length. In one or more embodiments, the undercoat washcoat layer also contains a material composition further effective to catalyze SCR of $NO_x$.

In one embodiment, the material composition A is effective to remove ammonia with $NH_3$ conversion greater than about 10% at a temperature greater than about 225° C. and gas hourly space velocity below about 300,000/hr across the monolithic substrate.

In one embodiment, the material composition A comprises a precious metal component dispersed on support particles. The support particles may comprise a refractory metal oxide containing alumina, silica, zirconia, titania, ceria, and physical mixtures or chemical combinations thereof, including atomically doped combinations. In one or more embodiments, the precious metal component contains ruthenium, rhodium, iridium, palladium, platinum, silver, or gold and physical mixtures or chemical combinations thereof, including atomically doped combinations.

In one embodiment, composition B is effective to simultaneously remove NO and $NH_3$, with NO conversion greater than about 50% and $N_2$ selectivity greater than about 50% at a temperature greater than about 300° C. and gas hourly space velocity below about 300,000/hr across the monolithic substrate.

In one or more embodiments, the material composition B is effective to remove ammonia with $NH_3$ conversion of at least 10% and $N_2$ selectivity of at least 50% at a temperature greater than about 350° C. and gas hourly space velocity below about 300,000/hr across the monolithic substrate and a $NO/NH_3$ molar ratio less than about 0.10.

In one or more embodiments, the material composition B contains a zeolitic or non-zeolitic molecular sieve. The molecular sieve can be an aluminosilicate molecular sieve having the one of the crystal framework types FAU, MFI, MOR, BEA, as per the designations in the Database of Zeolite Structures published by the International Zeolite Association (IZA).

In a specific embodiment, the material composition B contains an aluminosilicate molecular sieve having a CHA crystal framework type. In a more specific embodiment, the material composition B contains a silicoaluminophosphate molecular sieve having a CHA crystal framework type.

The molecular sieve according to an embodiment of the invention contains a metal from one of the groups VB, VIB, VIIB, VIIIB, IB, or IIB of the periodic table distributed on or within the molecular sieve, the metal being present in an amount between 0.1% and 10% by wt. of the molecular sieve. The metal may be selected from Cu, Fe, and mixtures or combinations thereof.

Another aspect of the invention pertains to a method of preparing a catalyst system for the treatment of an exhaust stream containing $NO_x$, the method comprising: coating one end of a monolithic substrate along at least about 5% of the substrate length with an undercoat washcoat layer containing a material composition effective to catalyze oxidation of $NH_3$; drying and calcining the coated substrate to fix the undercoat washcoat layer onto the substrate; recoating the substrate along at least about 50% of the substrate length with an overcoat washcoat layer containing a material composition effective to catalyze selective catalytic reduction of $NO_x$, to form one longitudinal zone comprising an SCR composition and a second longitudinal zone comprising an SCR composition overlaying at least part of the undercoat washcoat layer, the SCR composition being compositionally different from the undercoat layer; and drying and calcining the coated substrate to fix the SCR composition onto the substrate in the upstream zone and onto the undercoat washcoat layer in the downstream zone. In one embodiment, the method comprises coating the entire length of the substrate with multiple layers of an SCR composition.

Another aspect of the invention pertains to a method for treating emissions produced in a exhaust gas stream of a lean-burn engine, the method comprising: injecting ammonia or an ammonia precursor into an exhaust gas stream containing one or more of $NO_x$, CO, or hydrocarbons; passing the exhaust gas stream through an upstream zone of a catalyst system, the upstream zone containing a material composition effective to catalyze selective catalytic reduction of $NO_x$ in a washcoat layer coated on a monolithic substrate, and passing the exhaust gas stream through a downstream zone of a catalyst system, the downstream zone comprising; an undercoat washcoat layer containing a material composition effective to catalyze oxidation of $NH_3$.

In one embodiment of the methods for treating emissions, the ammonia or ammonia precursor that is unreacted in the upstream zone is selectively oxidized to $N_2$ in the downstream zone of the catalyst system. In one embodiment, the downstream zone covers in the range of about 5% and 100% of the total substrate length. In one or more embodiments, the monolithic substrate is a flow-through honeycomb substrate comprising plurality of fine, substantially parallel gas flow passages extending along the longitudinal axis of the substrate.

In one or more embodiments, the downstream zone of the catalyst system is effective to remove ammonia with $NH_3$ conversions of at least 10% and $N_2$ selectivities of at least 50% at temperatures greater than about 225° C. In an embodiment, the SCR composition in the upstream zone is effective to remove ammonia with $NH_3$ conversion of at least 10% and $N_2$ selectivity of at least 50% at a temperature greater than about 350° C. and gas hourly space velocity below about 300,000/hr across the monolithic substrate and a $NO/NH_3$ molar ratio less than about 0.10. The specific catalyst compositions for the catalysts used in the method aspect may include the catalysts described above with respect to the system.

BRIEF DESCRIPTION OF THE DRAWINGS

The following drawings illustrate embodiments of the invention. It is to be understood that the Figures are not intended to be to scale and that certain features such as monolith channels may be increased in size to show features according to embodiments of the invention.

DETAILED DESCRIPTION

Figures 1A, 1B:
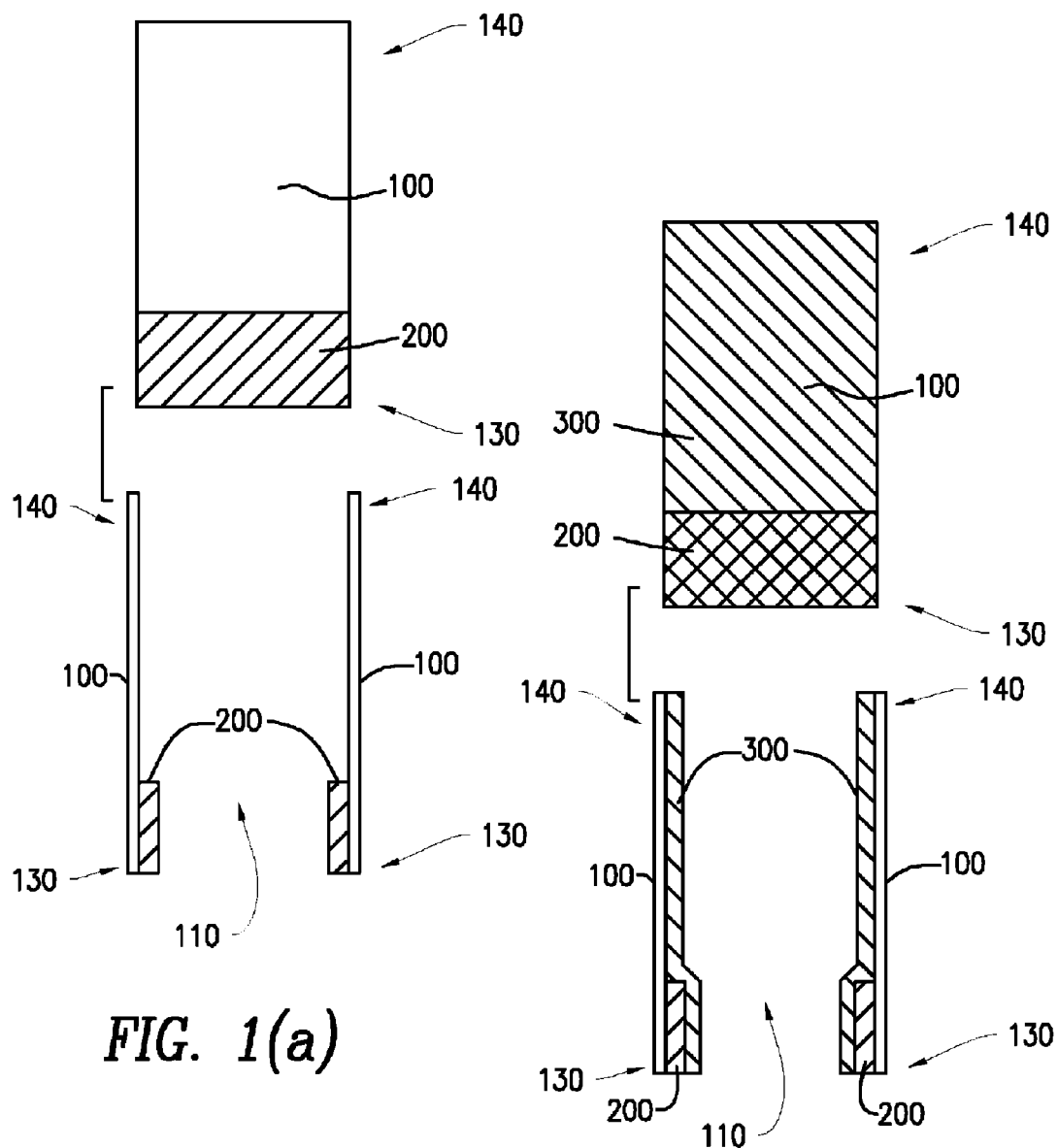
FIG. 1A shows a schematic of a catalyst monolith and the washcoat geometry in an individual monolith channel after coating with an undercoat.
FIG. 1B shows a schematic of a catalyst monolith and the washcoat geometry in an individual monolith channel after coating the entire substrate from FIG. 1A with an overcoat.

Before describing several exemplary embodiments of the invention, it is to be understood that the invention is not limited to the details of construction or process steps set forth in the following description. The invention is capable of other embodiments and of being practiced or being carried out in various ways.

As used in this specification and the appended claims, the singular forms "a", "an" and "the" include plural referents unless the context clearly indicates otherwise. Thus, for example, reference to "a catalyst" includes a mixture of two or more catalysts, and the like. As used herein, the term "abate" means to decrease in amount and "abatement" means a decrease in the amount, caused by any means. Where they appear herein, the terms "exhaust stream" and "engine exhaust stream" refer to the engine out effluent as well as to the effluent downstream of one or more other catalyst system components including but not limited to a diesel oxidation catalyst and/or soot filter.

An aspect of the invention pertains to a catalyst. According to one or more embodiments, the catalyst may be disposed on a monolithic substrate as a washcoat layer. As used herein and as described in Heck, Ronald and Robert Farrauto, *Catalytic Air Pollution Control*, New York: Wiley-Interscience, 2002, pp. 18-19, a washcoat layer consists of a compositionally distinct layer of material disposed on the surface of the monolithic substrate or an underlying washcoat layer. A catalyst can contain one or more washcoat layers, and each washcoat layer can have unique chemical catalytic functions.

In one or more embodiments, bifunctional catalysts are provided. According to one aspect of the invention, a bifunctional catalyst is provided that comprises a modular catalyst system with physically separate compositions for the SCR function and the $NH_3$ oxidation function. According to one or more embodiments, such modular catalyst systems permit greater flexibility to independently tune the kinetics of the two functions. By doing this, catalyst physical structure can be used to control the sequence of chemical catalytic events, to increase conversion of $NO_x$ and $NH_3$, and to increase selectivity to $N_2$. The catalyst compositions for the SCR function and $NH_3$ oxidation function can reside in discrete washcoat layers on the substrate or, alternatively, the compositions for the SCR and $NH_3$ oxidation functions can reside in discrete longitudinal zones on the substrate.

The term "SCR function" will be used herein to refer to a chemical process described by the stoichiometric Eq 1.

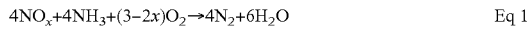

$$4NO_x + 4NH_3 + (3-2x)O_2 \rightarrow 4N_2 + 6H_2O \quad \text{Eq 1}$$

More generally it will refer to any chemical process in which $NO_x$ and $NH_3$ are combined to produce preferably $N_2$. The term "SCR composition" refers to a material composition effective to catalyze the SCR function. The term "$NH_3$ oxidation function" will be used herein to refer to a chemical process described by Eq 2.

$$4NH_3 + 5O_2 \rightarrow 4NO + 6H_2O \quad \text{Eq 2}$$

More generally, it will a refer to a process in which $NH_3$ is reacted with oxygen to produce NO, $NO_2$, $N_2O$, or preferably $N_2$. The term "$NH_3$ oxidation composition" refers to a material composition effective to catalyze the $NH_3$ oxidation function.

As described otherwise herein, one or more embodiments of the present invention provide for a catalyst having an upstream zone that includes a overcoat washcoat layer containing a composition effective for the selective catalytic reduction of $NO_x$; and a downstream zone that includes an undercoat washcoat layer containing a composition effective for the oxidation of ammonia, and a separate overcoat washcoat layer, effective for the selective catalytic reduction of $NO_x$, covering at least a portion of the undercoat layer.

The Substrate

According to one or more embodiments, the substrate for the catalyst may be any of those materials typically used for preparing automotive catalysts and will typically comprise a metal or ceramic honeycomb structure. Any suitable substrate may be employed, such as a monolithic flow-through substrate and having a plurality of fine, parallel gas flow passages extending from an inlet to an outlet face of the substrate, such that passages are open to fluid flow. The passages, which are essentially straight paths from their fluid inlet to their fluid outlet, are defined by walls on which the catalytic material is coated as a "washcoat" so that the gases flowing through the passages contact the catalytic material. The flow passages of the monolithic substrate are thin-walled channels which can be of any suitable cross-sectional shape such as trapezoidal, rectangular, square, sinusoidal, hexagonal, oval, circular, etc. Such structures may contain from about 60 to about 1200 or more gas inlet openings (i.e., "cells") per square inch of cross section (cpsi). A representative commercially-available flow-through substrate is the Corning 400/6 cordierite material, which is constructed from cordierite and has 400 cpsi and wall thickness of 6 mil. However, it will be understood that the invention is not limited to a particular substrate type, material, or geometry.

Ceramic substrates may be made of any suitable refractory material, e.g., cordierite, cordierite-α alumina, silicon nitride, zircon mullite, spodumene, alumina-silica magnesia, zircon silicate, sillimanite, magnesium silicates, zircon, petalite, α alumina, aluminosilicates and the like.

The substrates useful for the catalysts according to one or more embodiments of the present invention may also be metallic in nature and be composed of one or more metals or metal alloys. Exemplary metallic supports include the heat resistant metals and metal alloys such as titanium and stainless steel as well as other alloys in which iron is a substantial or major component. Such alloys may contain one or more of nickel, chromium and/or aluminum, and the total amount of these metals may comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The metallic substrates may be employed in various shapes such as corrugated sheet or monolithic form. A representative commercially-available metal substrate is manufactured by Emitec. However, it will be understood that the invention is not limited to a particular substrate type, material, or geometry. The surface of the metal substrates may be oxidized at high temperatures, e.g., 1000° and higher, to form an oxide layer on the surface of the substrate, improving the corrosion resistance of the alloy. Such high temperature-induced oxidation may also enhance the adherence of the refractory metal oxide support and catalytically-promoting metal components to the substrate.

SCR Composition

In accordance with one or more embodiments of the invention, a component effective to catalyze the SCR function (herein referred to as an "SCR component") is utilized in a washcoat as part of a $NO_x$ abatement catalyst composition. Typically, the SCR component is part of a composition that includes other components in a washcoat. However, in one or more embodiments the $NO_x$ abatement catalyst composition may include only the SCR component.

In some embodiments, the invention utilizes an SCR component which consists of a microporous inorganic framework or molecular sieve onto which a metal from one of the groups VB, VIB, VIIB, VIIIB, IB, or IIB of the periodic table has been deposited onto extra-framework sites on the external surface or within the channels, cavities, or cages of the molecular sieves. Metals may be in one of several forms, including, but not limited to, zerovalent metal atoms or clusters, isolated cations, mononuclear or polynuclear oxycations, or as extended metal oxides. In specific embodiments, the metals include iron, copper, and mixtures or combinations thereof.

In certain embodiments, the SCR component contains in the range of about 0.10% and about 10% by weight of a group VB, VIB, VIIB, VIIIB, IB, or IIB metal located on extraframework sites on the external surface or within the channels, cavities, or cages of the molecular sieve. In preferred embodiments, the extraframework metal is present in an amount of in the range of about 0.2% and about 5% by weight.

The microporous inorganic framework may consist of a microporous aluminosilicate or zeolite having any one of the framework structures listed in the *Database of Zeolite Structures* published by the International Zeolite Association (IZA). The framework structures include, but are not limited to those of the CHA, FAU, BEA, MFI, MOR types. Non-limiting examples of zeolites having these structures include chabazite, faujasite, zeolite Y, ultrastable zeolite Y, beta zeolite, mordenite, silicalite, zeolite X, and ZSM-5. Some embodiments utilize aluminosilicate zeolites that have a silica/alumina molar ratio (defined as $SiO_2/Al_2O_3$ and abbreviated as SAR) from at least about 5, preferably at least about 20, with useful ranges of from about 10 to 200.

In a specific embodiment, the SCR component includes an aluminosilicate molecular sieve having a CHA crystal framework type, an SAR greater than about 15, and copper content exceeding about 0.2 wt %. In a more specific embodiment, the SAR is at least about 10, and copper content from about 0.2 wt % to about 5 wt %. Zeolites having the CHA structure, include, but are not limited to natural chabazite, SSZ-13, LZ-218, Linde D, Linde R, Phi, ZK-14, and ZYT-6. Other suitable zeolites are also described in U.S. patent application Ser. No. 12/038,423, entitled "Copper CHA Zeolite Catalysts," the entire content of which is incorporated herein by reference, published as PCT International Publication No. WO 2008/106519.

According to one or more embodiments of the invention, SCR compositions which include non-zeolitic molecular sieves are provided. As used herein, the terminology "non zeolitic molecular sieve" refers to corner sharing tetrahedral frameworks where at least a portion of the tetrahedral sites are occupied by an element other than silicon or aluminum. Non-limiting examples of such molecular sieves include aluminophosphates and metal-aluminophosphates, wherein metal could include silicon, copper, zinc or other suitable metals. Such embodiments may include a non-zeolitic molecular sieve having a crystal framework type selected from CHA, FAU, MFI, MOR, and BEA.

Non-zeolitic compositions can be utilized in the SCR component according to embodiments of the present invention. Specific non-limiting examples include sillicoaluminophosphates SAPO-34, SAPO-37, SAPO-44. Synthesis of synthetic form of SAPO-34 is described in U.S. Pat. No. 7,264,789, which is hereby incorporated by reference. A method of making yet another synthetic non-zeolitic molecular sieve having chabazite structure, SAPO-44, is described in U.S. Pat. No. 6,162,415, which is hereby incorporated by reference.

SCR compositions consisting of vanadium supported on a refractory metal oxide such as alumina, silica, zirconia, titania, ceria and combinations thereof are also well known and widely used commercially in mobile applications. Typical compositions are described in U.S. Pat. Nos. 4,010,238 and 4,085,193, of which the entire contents are incorporated herein by reference. Compositions used commercially, especially in mobile applications, comprise $TiO_2$ on to which $WO_3$ and $V_2O_5$ have been dispersed at concentrations ranging from 5 to 20 wt. % and 0.5 to 6 wt. %, respectively. These catalysts may contain other inorganic materials such as $SiO_2$ and $ZrO_2$ acting as binders and promoters.

$NH_3$ Oxidation Composition

In accordance with one or more embodiments of the invention, a composition effective to catalyze the $NH_3$ oxidation function (herein referred to as an "$NH_3$ oxidation component") is utilized in a $NO_x$ abatement catalyst. The ammonia contained in an exhaust gas stream is reacted with oxygen over the $NH_3$ oxidation component to form $N_2$ over a catalyst according to Eq 1.

According to one or more embodiments, the $NH_3$ oxidation component may be a supported precious metal component which is effective to remove ammonia from the exhaust gas stream. In one or more embodiments, the precious metal component includes ruthenium, rhodium, iridium, palladium, platinum, silver or gold. In specific embodiments, the precious metal component includes physical mixtures and chemical and atomically-doped combinations of ruthenium, rhodium, iridium, palladium, platinum, silver and gold. In a more specific embodiment, the precious metal component includes platinum. In an even more specific embodiment, the platinum is present in an amount in the range of about 0.008% to about 2% by wt (metal), based on Pt support loading.

According to one or more embodiments, the precious metal component is deposited on a high surface area refractory metal oxide support. Examples of suitable high surface area refractory metal oxides include, but are not limited to, alumina, silica, titania, ceria, and zirconia, as well as physical mixtures, chemical combinations and/or atomically-doped combinations thereof. In specific embodiments, the refractory metal oxide may contain a mixed oxide such as silica-alumina, amorphous or crystalline aluminosilicates, alumina-zirconia, alumina-lanthana, alumina-chromia, alumina-baria, alumina-ceria, and the like. An exemplary refractory metal oxide comprises high surface area γ-alumina having a specific surface area of about 50 to about 300 $m^2/g$.

As otherwise mentioned herein, the $NH_3$ oxidation component may include a zeolitic or non-zeolitic molecular sieve, which may have any one of the framework structures listed in the *Database of Zeolite Structures* published by the International Zeolite Association (IZA). The framework structures include, but are not limited to those of the CHA, FAU, BEA, MFI, and MOR types. In one embodiment, a molecular sieve component may be physically mixed with an oxide-supported platinum component. In an alternative embodiment, platinum may be distributed on the external surface or in the channels, cavities, or cages of the molecular sieve.

The $NH_3$ oxidation composition may contain a component active for the ammonia SCR function. The SCR component may consist of any one of the SCR components described in the preceding section. In on embodiment, the $NH_3$ oxidation component consists of a physical mixture of an oxide-supported platinum component and an SCR component. In an alternative embodiment, platinum may be distributed on the external surface or in the channels, cavities, or cages of the SCR component.

Washcoat Layers

According to one or more embodiments, the SCR component and the $NH_3$ oxidation component can be applied in washcoat layers, which are coated upon and adhered to the substrate.

For example, a washcoat layer of a composition containing an $NH_3$ oxidation component may be formed by preparing a mixture or a solution of a platinum precursor in a suitable solvent, e.g. water. Generally, from the point of view of economics and environmental aspects, aqueous solutions of soluble compounds or complexes of the platinum are preferred. Typically, the platinum precursor is utilized in the form of a compound or complex to achieve dispersion of the platinum precursor on the support. For purposes of the present invention, the term "platinum precursor" means any compound, complex, or the like which, upon calcination or initial phase of use thereof, decomposes or otherwise converts to a catalytically active form. Suitable platinum complexes or compounds include, but are not limited to platinum chlorides (e.g. salts of $[PtCl_4]^{2-}$, $[PtCl_6]^{2-}$), platinum hydroxides (e.g. salts of $[Pt(OH)_6]^{2-}$), platinum ammines (e.g. salts of $[Pt(NH_3)_4]^{2+}$, $[Pt(NH_3)_4]^{4+}$), platinum hydrates (e.g. salts of $[Pt(OH_2)_4]^{2+}$), platinum bis(acetylacetonates), and mixed compounds or complexes (e.g. $[Pt(NH_3)_2(Cl)_2]$). A representative commercially-available platinum source is 99% ammonium hexachloroplatinate from Strem Chemicals, Inc., which may contain traces of other precious metals. However, it will be understood that this invention is not restricted to platinum precursors of a particular type, composition, or purity. A mixture or solution of the platinum precursor is added to the support by one of several chemical means. These include impregnation of a solution of the platinum precursor onto the support, which may be followed by a fixation step incorporating acidic component (e.g. acetic acid) or a basic component (e.g. ammonium hydroxide). This wet solid can be chemically reduced or calcined or be used as is. Alternatively, the support may be suspended in a suitable vehicle (e.g. water) and reacted with the platinum precursor in solution. This latter method is more typical when the support is a zeolite, and it is desired to fix the platinum precursor to ion-exchange sites in the zeolite framework. Additional processing steps may include fixation by an acidic component (e.g. acetic acid) or a basic component (e.g. ammonium hydroxide), chemical reduction, or calcination.

In one or more embodiments utilizing washcoat layers of an SCR composition, the layer can contain a zeolitic or non-zeolitic molecular sieve on which has been distributed a metal from one of the groups VB, VIB, VIIB, VIIIB, IB, or IIB of the periodic table. An exemplary metal of this series is copper. Exemplary molecular sieves, include, but are not limited to zeolites having one of the following crystal structures CHA, BEA, FAU, MOR, and MFI. A suitable method for distributing the metal on the zeolite is to first prepare a mixture or a solution of the metal precursor in a suitable solvent, e.g. water. Generally, from the point of view of economics and environmental aspects, aqueous solutions of soluble compounds or complexes of the metal are preferred. For purposes of the present invention, the term "metal precursor" means any compound, complex, or the like which, can be dispersed on the zeolite support to give a catalytically-active metal component. For the exemplary Group IB metal copper, suitable complexes or compounds include, but are not limited to anhydrous and hydrated copper sulfate, copper nitrate, copper acetate, copper acetylacetonate, copper oxide, copper hydroxide, and salts of copper ammines (e.g. $[Cu(NH_3)_4]^{2+}$). A representative commercially-available copper source is 97% copper acetate from Strem Chemicals, Inc., which may contain traces of other metals, particularly iron and nickel. However, it will be understood that this invention is not restricted to metal precursors of a particular type, composition, or purity. The molecular sieve can be added to the solution of the metal component to form a suspension. This suspension can be allowed to react so that the copper component is distributed on the zeolite. This may result in copper being distributed in the pore channels as well as on the outer surface of the molecular sieve. Copper may be distributed as copper (II) ions, copper (I) ions, or as copper oxide. After the copper is distributed on the molecular sieve, the solids can be separated from the liquid phase of the suspension, washed, and dried. The resulting copper-containing molecular sieve may also be calcined to fix the copper.

To apply a washcoat layer according to one or more embodiments of the invention, finely divided particles of a catalyst, consisting of the SCR component, the $NH_3$ oxidation component, or a mixture thereof, are suspended in an appropriate vehicle, e.g., water, to form a slurry. Other promoters and/or stabilizers and/or surfactants may be added to the slurry as mixtures or solutions in water or a water-miscible vehicle. In one or more embodiments, the slurry is comminuted to result in substantially all of the solids having particle sizes of less than about 10 microns, i.e., in the range of about 0.1-8 microns, in an average diameter. The comminution may be accomplished in a ball mill, continuous Eiger mill, or other similar equipment. In one or more embodiments, the suspension or slurry has a pH of about 2 to less than about 7. The pH of the slurry may be adjusted if necessary by the addition of an adequate amount of an inorganic or an organic acid to the slurry. The solids content of the slurry may be, e.g., about 20-60 wt. %, and more particularly about 35-45 wt. %. The substrate may then be dipped into the slurry, or the slurry otherwise may be coated on the substrate, such that there will be deposited on the substrate a desired loading of the catalyst layer. Thereafter, the coated substrate is dried at about 100° C. and calcined by heating, e.g., at 300-650° C. for about 1 to about 3 hours. Drying and calcination are typically done in air. The coating, drying, and calcination processes may be repeated if necessary to achieve the final desired gravimetric amount of the catalyst washcoat layer on the support. In some cases, the complete removal of the liquid and other volatile components may not occur until the catalyst is placed into use and subjected to the high temperatures encountered during operation.

After calcining, the catalyst washcoat loading can determined through calculation of the difference in coated and uncoated weights of the substrate. As will be apparent to those of skill in the art, the catalyst loading can be modified by altering the solids content of the coating slurry and slurry viscosity. Alternatively, repeated immersions of the substrate in the coating slurry can be conducted, followed by removal of the excess slurry as described above.

Method of Preparing a Catalyst

As shown in FIG. 1, a catalyst according to one or more embodiments of the present invention can be prepared in a two-step process. In the first step, shown in FIG. 1A, a carrier substrate 100, which, in specific embodiments, contains channels 110 of dimensions in the range of about 100 channels/in$^2$ and 1000 channels/in$^2$, is coated with an undercoat washcoat layer 200, having a composition effective for catalyzing the removal of $NH_3$. For ease of illustration of the washcoat, only a single channel 110 is shown. The undercoat washcoat layer 200 is applied to one end of the substrate 100, distributed, dried, and calcined as described in the preceding section. The substrate shown in FIG. 1A has an upstream or inlet zone 140 and a downstream or outlet zone 130. In one embodiment, the $NH_3$ oxidation component in layer 200 is applied in the range of about 5% to about 100% of the substrate length. In a specific embodiment, the $NH_3$ oxidation component is applied to between 10 and 40% of the substrate length.

In the second step, an SCR composition that contains an SCR component is applied as overcoat washcoat layer 300, which is shown as an overcoat layer to the entire length of the substrate 100, as shown in FIG. 1B. To reach the required loading specified for the SCR component, the second coating step may be repeated to form multiple coatings of the SCR composition, to collectively form the overcoat layer 300. The overcoat layer is dried and calcined as described in the preceding section. These two steps yield a catalyst having an upstream or inlet zone 140 (heretofore referred to as the "SCR zone") comprising only the SCR composition. The downstream or outlet zone 130 (heretofore referred to as the "AMOx zone") comprises an undercoat washcoat layer 200 containing the $NH_3$ oxidation component and an overcoat washcoat layer 300 containing the SCR component. The generation of a two-layer outlet zone that physically separates the $NH_3$ oxidation component and the SCR component is an important feature affecting the performance of the catalyst, and distinguishes this particular methodology for preparation of an integrated SCR+AMOx catalyst.

In one embodiment, the upstream zone comprises an SCR catalyst washcoat layer disposed on the carrier and the downstream zone comprises an undercoat layer containing an $NH_3$ oxidation component disposed on the carrier and an SCR catalyst washcoat layer disposed on at least a portion of the undercoat layer. According to a specific embodiment, the ratio of the front zone length to the total substrate length is at least about 0.4. In a more specific embodiment the ratio of the front zone length to the total substrate length is in the range of about 0.5 and about 0.9. In an even more specific embodiment, the ratio of the front zone length to the total substrate length is in the range of about 0.6 and about 0.8.

After the overcoat washcoat layer is applied, the finished catalyst is placed in the exhaust system, taking care that the orientation is such that the SCR zone is disposed in the upstream position 140 of the catalyst. In alternative embodiments, additional layers may be applied to the overcoat layer.

In an alternative embodiment, the $NH_3$ oxidation component is applied as an undercoat layer over the entire length of the substrate in the first step. In the second step, the SCR component is applied as an overcoat layer over the entire length of the substrate. This yields a catalyst in which the AMOx zone 200 covers the entire length of the substrate. This catalyst is heretofore referred to as a "standalone AMOx."

Method for Treating Emissions

Another aspect of the present invention includes a method of treating emissions produced in the exhaust gas stream of an engine. The exhaust gas stream can include one or more of $NO_x$, CO, hydrocarbons, and ammonia. In one or more embodiments, the method includes injecting ammonia or an ammonia precursor into an exhaust gas stream and then passing the exhaust gas stream first through an upstream SCR zone described herein to remove $NO_x$ by the SCR function. In such embodiments, the exhaust gas stream is then passed through a downstream AMOx zone to remove ammonia by the $NH_3$ oxidation function. The downstream catalyst zone may also serve to oxidize one or more of CO, hydrocarbons, in addition to ammonia.

In one embodiment, the upstream SCR zone and the downstream AMOx zone are disposed on a single catalyst substrate. The SCR zone comprised in the range of about 50% to about 90% of the substrate length, and consists of only the SCR component. The AMOx zone comprises in the range of about 5% to about 50% of the substrate length, and consists of an undercoat layer containing the $NH_3$ oxidation component and an overcoat layer containing the SCR component.

In an alternative embodiment of the method, the upstream SCR zone is disposed on one carrier substrate, and the downstream AMOx zone is disposed on a separate carrier substrate. In this embodiment, the AMOx zone is prepared as a standalone AMOx as described above. The volume of the downstream standalone AMOx catalyst is in the range of about 10% to about 100% of the volume of the upstream SCR catalyst, and consists of an undercoat layer containing the $NH_3$ oxidation component and an overcoat layer containing the SCR component.

Figure 2:
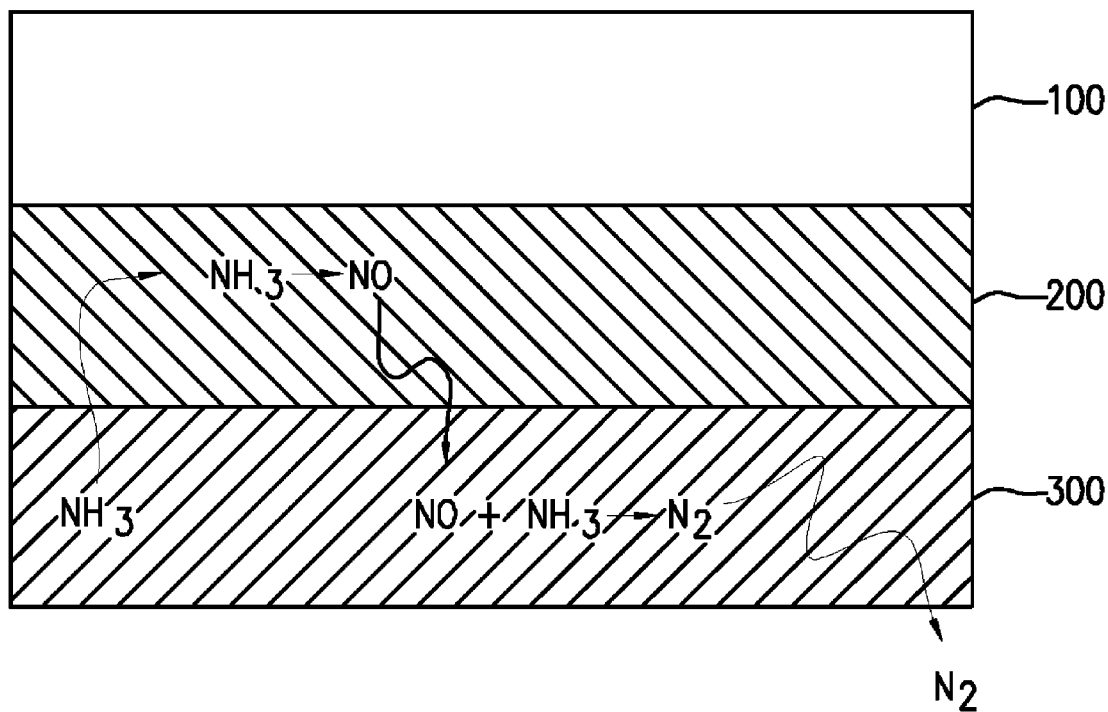
FIG. 2 is a schematic view illustrating the conversion of $NH_3$ to $N_2$ in a catalyst system according to one or more embodiments.

In both embodiments above, the AMOx zone consists of two compositionally and functionally distinct layers. The undercoat layer consists of a supported precious metal component and functions to oxidize ammonia according to Eq 2. The overcoat layer is free of precious metal, and consists of a catalyst composition effective for the conversion of $NO_x$ and ammonia to dinitrogen. FIG. 2 illustrates how these two layers function together to increase the $N_2$ selectivity for $NH_3$ oxidation in the AMOx catalyst. Ammonia molecules that are desorbed from an SCR catalyst under conditions where it cannot be quickly consumed by a molecule of $NO_x$ (e.g., under a thermal desorption event) move down the channel 110 while colliding with the washcoat layer 300 in the upstream zone 140, comprising an SCR catalyst. The molecule can diffuse into and out of the washcoat layer 300, but it is not otherwise converted by the catalyst until it enters the downstream zone 130 and contacts the undercoat layer 200, which contains a composition that includes an $NH_3$ oxidation component. In the undercoat layer 200, the ammonia is initially converted to NO, which subsequently may diffuse to the overcoat layer 300. In the overcoat layer containing an SCR catalyst composition, the NO may react with $NH_3$ to form $N_2$, thereby increasing the net selectivity to $N_2$.

Placing the supported precious metal in the bottom washcoat layer underneath the SCR component in the overcoat layer restricts NO to be generated only in the undercoat layer. This has the effect of increasing the average residence lifetime of NO within the catalyst washcoat layers. As the residence time of the NO is increased, NO has a higher probability to collide with a molecule of ammonia in the SCR washcoat layer and to produce $N_2$, which is ultimately released from the catalyst.

In use, the upstream SCR zone 140 of the catalyst is primarily responsible for removing $NO_x$ emissions from the exhaust by ammonia selective catalytic reduction reaction. The downstream AMOx zone is primarily responsible for the ammonia oxidation function. As discussed otherwise herein, the downstream zone 130, having an overlayer of the SCR composition will have SCR activity and can further function in $NO_x$ abatement. In this manner, the AMOx zone can contribute to net $NO_x$ removal. In addition, at elevated temperatures, some SCR compositions, particularly copper-based SCR catalysts, can also have appreciable ammonia oxidation activity even in the absence of a precious metal component. Furthermore, copper-based SCR catalyst compositions can convert $NH_3$ to $N_2$ with high selectivity at temperatures above 350° C. In one or more embodiments, the SCR zone can thereby contribute to abatement of excess ammonia.

Another aspect of the present invention is directed to an emission treatment system comprising one or more additional components for the treatment of diesel exhaust gas emissions. Diesel engine exhaust is a heterogeneous mixture which contains not only gaseous emissions such as carbon monoxide, unburned hydrocarbons and $NO_x$, but also condensed phase materials (liquids and solids) which constitute the particulates or particulate matter. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst and a soot filter, in addition to a catalyst for the reduction of $NO_x$. Embodiments of the present invention can be incorporated into diesel exhaust gas treatment systems known in the art. One such system is disclosed in U.S. Pat. No. 7,229,597, which is incorporated herein by reference in its entirety.

Figure 3:
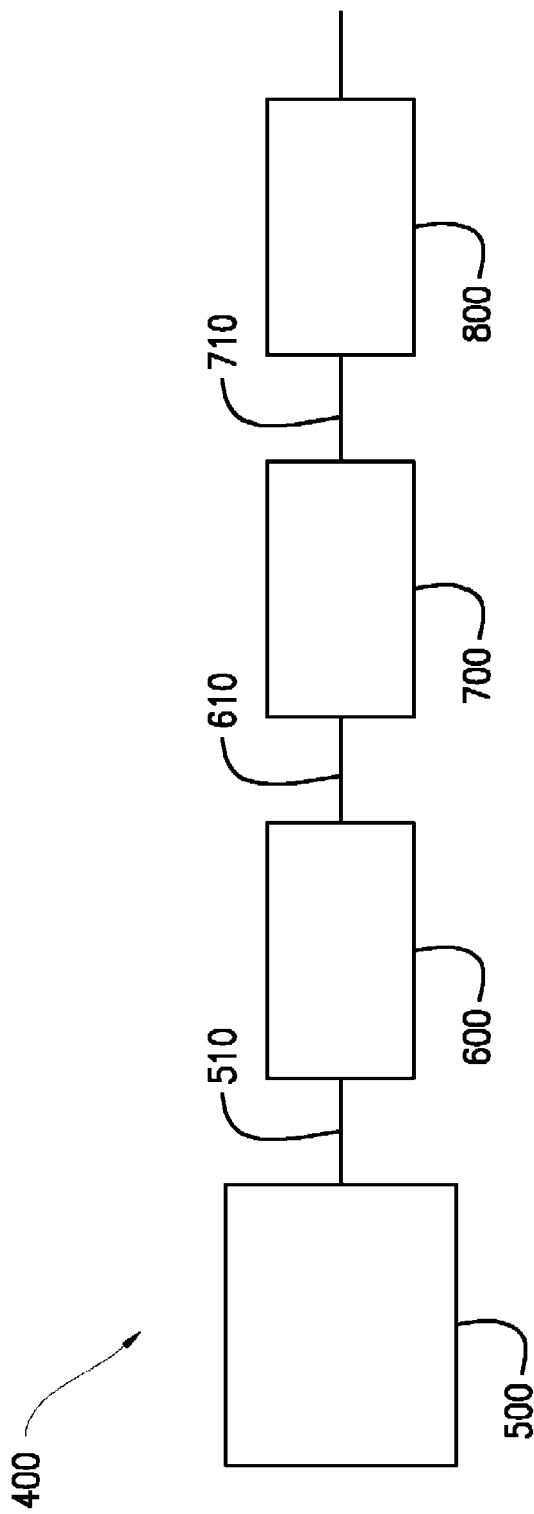
FIG. 3 is a schematic of an engine emission treatment system, in accordance with one embodiment of the present invention.

An example of an emission treatment system may be more readily appreciated by reference to FIG. 3, which depicts a schematic representation of an emission treatment system 400, in accordance with this embodiment of the present invention. An exhaust gas stream containing gaseous pollutants (e.g., unburned hydrocarbons, carbon monoxide and $NO_x$) and particulate matter is conveyed via line 510 from an engine 500 to a diesel oxidation catalyst (DOC) 600. In the DOC, unburned gaseous and non-volatile hydrocarbons and carbon monoxide are largely combusted to form carbon dioxide and water. In addition, a proportion of the NO of the $NO_x$ component may be oxidized to $NO_2$ in the DOC. The exhaust stream is next conveyed via line 610 to a catalyzed soot filter (CSF) 700, which traps particulate matter present within the exhaust gas stream. The CSF is optionally catalyzed for passive regeneration. After removal of particulate matter, via CSF 700, the exhaust gas stream is conveyed via line 710 to a downstream catalyst 800, according to the embodiments described herein, for the treatment and/or conversion of $NO_x$ and ammonia.

immobilizing Pt(IV) onto γ-alumina (SBA-150) by incipient wetness impregnation of $Pt(OH)_6^{2-}$ at pH 9.5, followed by fixation with acetic acid. The resulting yellow solid contained about 0.58 wt % Pt on a volatile-free solids basis. The solid was suspended in deionized water and passed through a continuous mill to reduce the particle size. The monolith substrate was dipped into the resulting slurry, drained, and the excess slurry removed by blowing compressed air through the channels. The monolith sample was dried and calcined at between 450-600° C. Comparative samples 1A and 1B, consisting only of Pt on $Al_2O_3$, were set aside at this point. The iron or copper-exchanged zeolite was suspended in deionized water and the suspension milled to decrease particle size. Monoliths, to which a supported Pt washcoat had already been applied as described above, were dipped in the resulting slurry, drained, and the excess slurry was removed by compressed air. The monolith samples were dried and calcined at 450° C. to give layered catalysts 1C-1G and 1K-1M. Uniform catalysts 1H, 1I, and 1N were made by combining the Pt on SBA-150 slurries and the appropriate metal-exchanged zeolite slurries in the desired proportion, and dipping fresh monoliths into the combined slurry. The cores were dried and then calcined at 450° C.

TABLE 1

Ammonia oxidation catalysts based on γ-alumina-supported Pt and zeolite-based SCR compositions

| | Pt support[a] $g/in^3$ | Pt wt % (metal) | Total Pt $g/ft^3$ | Cocatalyst $g/in^3$ | Cocatalyst composition | $NH_3$ conv[b] 250° C. | $N_2$ sel[c] 250° C. | $N_2$ sel[c] 400° C. |
|---|---|---|---|---|---|---|---|---|
| 1A | 0.55 | 0.58 | 5.52 | 0.00 | — | 96 | 58 | 18 |
| 1B | 0.51 | 0.58 | 5.09 | 0.00 | — | 96 | 53 | 14 |
| 1C | 0.47 | 0.58 | 4.67 | 2.03 | CuCHA[d] | 89 | 68 | 96 |
| 1D | 0.47 | 0.58 | 4.67 | 0.93 | CuCHA[d] | 91 | 67 | 78 |
| 1E | 0.47 | 0.58 | 4.67 | 1.11 | CuCHA[d] | 89 | 72 | 92 |
| 1F | 0.47 | 0.58 | 4.67 | 1.82 | CuCHA[d] | 88 | 74 | 95 |
| 1G[e] | 0.47 | 0.58 | 4.67 | 1.82 | CuCHA[d] | 84 | 77 | 81 |
| 1H[f] | 0.40 | 0.58 | 3.99 | 2.06 | CuCHA[d] | 79 | 82 | 82 |
| 1I[e,f] | 0.43 | 0.58 | 4.33 | 2.23 | CuCHA[d] | 56 | 92 | 71 |
| 1K | 0.51 | 0.57 | 5.00 | 1.61 | FeBEA[g] | 94 | 58 | 74 |
| 1L | 0.55 | 0.57 | 5.43 | 2.16 | FeBEA[g] | 94 | 57 | 85 |
| 1M | 0.51 | 0.57 | 5.00 | 2.97 | FeBEA[g] | 90 | 59 | 94 |
| 1N[f] | 0.48 | 0.57 | 4.74 | 2.40 | FeBEA[g] | 96 | 58 | 69 |
| 1Y[h] | — | — | — | 2.90 | CuCHA[d] | — | — | — |
| 1Z[i] | — | — | — | 3.00 | FeBEA[g] | — | — | — |

[a] γ-$Al_2O_3$(SBA-150)
[b] percent $NH_3$ conversion
[c] percent $N_2$ selectivity
[d] 2.3% Cu by wt (metal) on SSZ-13, SAR = 30
[e] Aged 750° C., 5 hr, 10% $H_2O$/air
[f] Uniform physical mixture of supported Pt and zeolite loaded as single layer
[g] 1.2% Fe by wt (metal) on beta zeolite, SAR = 30
[h] Aged 655° C., 25 hr, 10% H2O/air
[i] Aged 750° C., 25 hr, 10% H2O/air.

Without intending to limit the invention in any manner, embodiments of the present invention will be more fully described by the following examples.

PREPARATION OF SAMPLES 1A-1I

A series of catalysts 1A-1I was prepared as described in Table 1. All of the catalysts consist of powders disposed on cylindrical 1.0 inch OD×3.0 inch long cordierite honeycomb monoliths with channel dimensions of 400 cpsi and wall thickness of 6 mil. These catalysts were prepared by first

PREPARATION OF SAMPLES 1K-1N

A series of catalysts 1K-1N was prepared as described in Table 1. All of the catalysts consist of powders disposed on cylindrical 1.0 inch OD×3.0 inch long cordierite honeycomb monoliths with channel dimensions of 400 cpsi and wall thickness of 6 mil. The Pt on γ-alumina undercoat layer was prepared and applied to 1K-1N in exactly the same manner as described above. The overlayer was applied to 1K-1M as described above for the CuCHA overlayer, except that FeBEA, containing 1.5 wt % Fe on a volatile free solids basis and having SAR=30, was substituted for the CuCHA material. The uniform catalyst 1N was made by combining the Pt on SBA-150 slurry and the FeBEA slurries in the desired proportion, and dipping fresh monoliths into the combined slurry, followed by drying and calcining at 450° C.

AGING OF SAMPLES 1A-1Z

Prior to analysis or evaluation, all of the catalysts were thermally aged in air at 750° C. for 5 hrs except where otherwise noted in Table 1. Thermal agings of catalysts were done in a box furnace. The aging protocol serves a dual purpose. First, meaningful evaluation results can only be obtained under conditions where the catalyst activity does not change over several evaluation runs. Thermal annealing insures that the catalyst is at a steady-state with respect to thermal changes. Second, catalysts were evaluated under thermal conditions that model a reasonable fraction of vehicle life to insure that the catalyst activity after long-term field usage will be adequate.

EXAMPLE 1

Figure 4A:
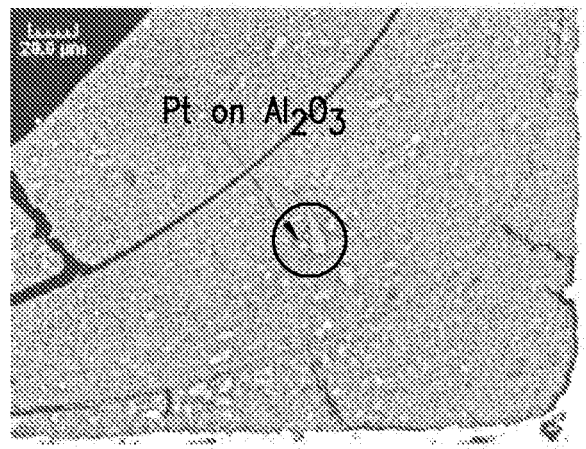
FIG. 4A shows an SEM image of the uniform catalyst H, consisting of a physical mixture of 0.58 wt % Pt supported on γ-alumina, and copper(II)-exchanged chabazite zeolite.
Figure 4B:
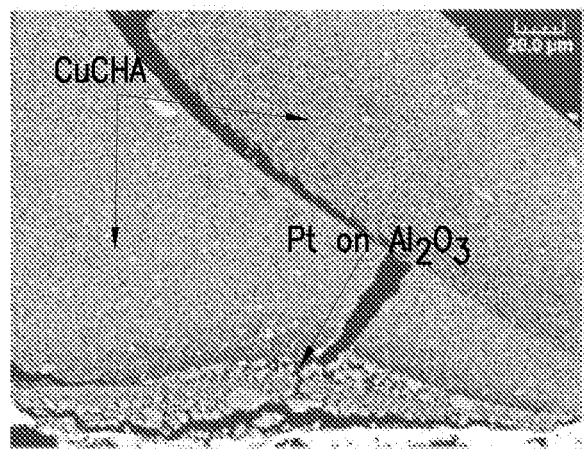
FIG. 4B shows an SEM image of the layered catalyst B, consisting of a bottom washcoat layer having 0.58 wt % Pt supported on γ-alumina, and a top washcoat layer having copper(II)-exchanged chabazite zeolite.

The compositional architecture of the catalysts was visualized using SEM. FIG. 4A shows a scanning electron micrograph of comparative catalyst 1H, clearly showing grains of γ-alumina uniformly dispersed throughout the washcoat depth. To achieve the desired catalyst loading in the uniform catalyst, the powder slurry was applied in three coating steps, and this is evident in the boundary between the layers. These do not constitute boundaries between different compositions, however, and so catalyst 1H does not fit the present definition of a layered catalyst. FIG. 4B shows a micrograph of representative catalyst 1C, which has bulk composition and total washcoat loading comparable to 1H. However, in catalyst C the $Pt/Al_2O_3$ material is localized in a thin layer at the monolith surface, with essentially no γ-alumina in the upper washcoat layer. The SEM images indicate that the desired compositional layering effect can be achieved, where the Pt has been deposited and isolated deep in the catalyst washcoat.

EXAMPLE 2

The catalysts in Table 1 were evaluated for ammonia oxidation activity in a laboratory model gas reactor operated at gas feed conditions as follows: $NH_3$=500 ppm, $O_2$=10% (delivered as house air), $H_2O$=5%, balance=$N_2$. All evaluations were done at a GHSV=100,000/hr on cores that were 3 in (7.62 cm) in length, giving a linear flow velocity of 2.11 m/sec. For a channel dimension of 1.27 mm and T=300° C., the Reynolds number of 9.1 for the system, so that the reactor operates in a laminar flow regime.

Figure 5A:
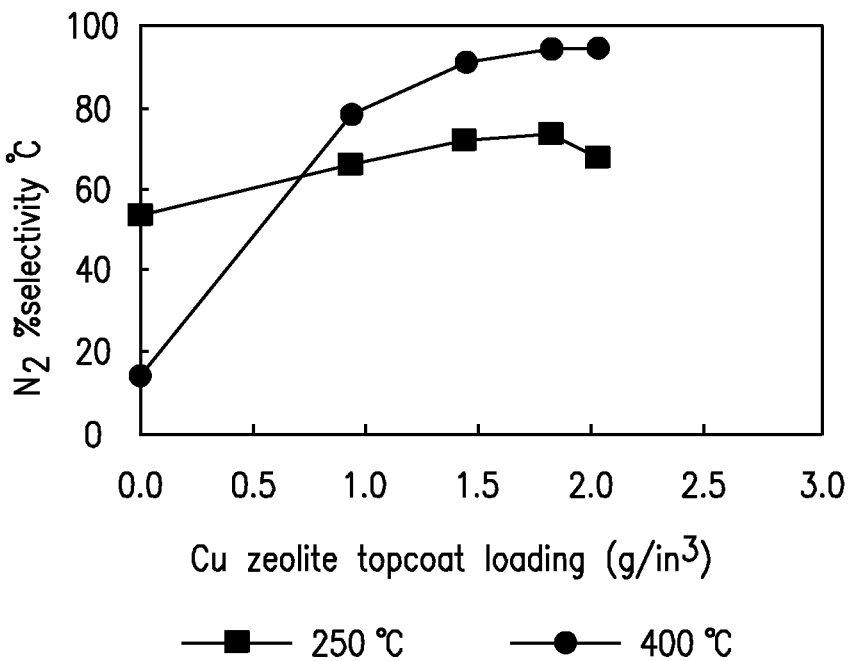
FIG. 5A shows the $N_2$ selectivity for ammonia oxidation for catalysts B-F as a function of the top washcoat loading.
Figure 5B:
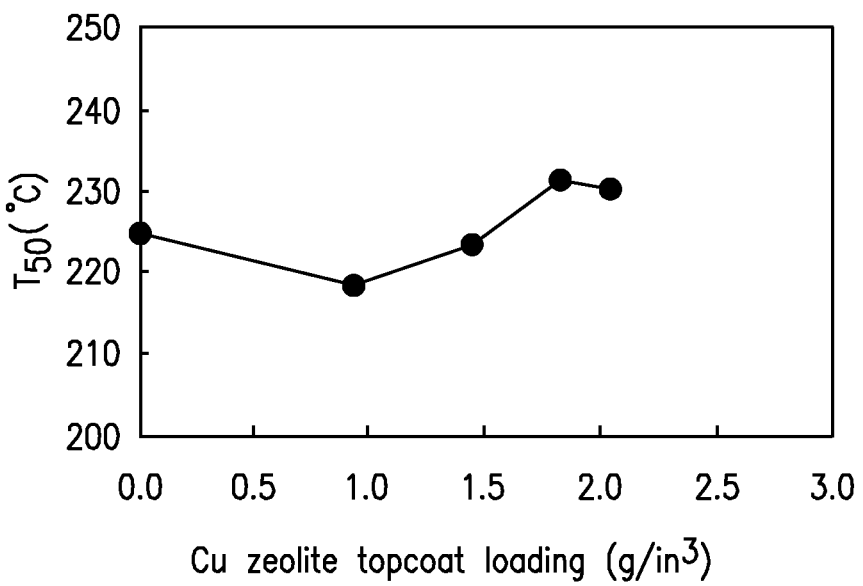
FIG. 5B shows the $NH_3$ lightoff temperature $T_{50}$ for ammonia oxidation for catalysts B-F as a function of the top washcoat loading.

The data in FIG. 5A show $N_2$ selectivity for samples 1B-1F, in which the top washcoat composition consists of copper (II) exchanged chabazite zeolite, 2.9% Cu by wt. Selectivity was evaluated at 250° C. (square symbols) and 400° C. (round symbols). The $N_2$ selectivity is a function of the CuCHA content, especially at 400° C. Catalyst 1C, containing only Pt on $Al_2O_3$, gave only 15% selectivity, whereas samples having more than 1.4 g/in$^3$ CuCHA present as an overlayer on top of the $Pt/Al_2O_3$ layer give greater than 90% selectivity to $N_2$. At 250° C. the dependence of $N_2$ selectivity on CuCHA is not as strong, but there is still an increase from 55% to 75% $N_2$ selectivity as CuCHA is increased fro zero to 1.4 g/in$^3$. These data show the value of the SCR co-catalyst overlayer in tuning the $N_2$ selectivity to higher values. Furthermore, the data in FIG. 5B show that the lightoff temperature $T_{50}$ lies between 220° C. and 235° C. with no obvious trend, indicating no substantial penalty $NH_3$ activity due to the presence of the topcoat.

EXAMPLE 3

Figure 6A:
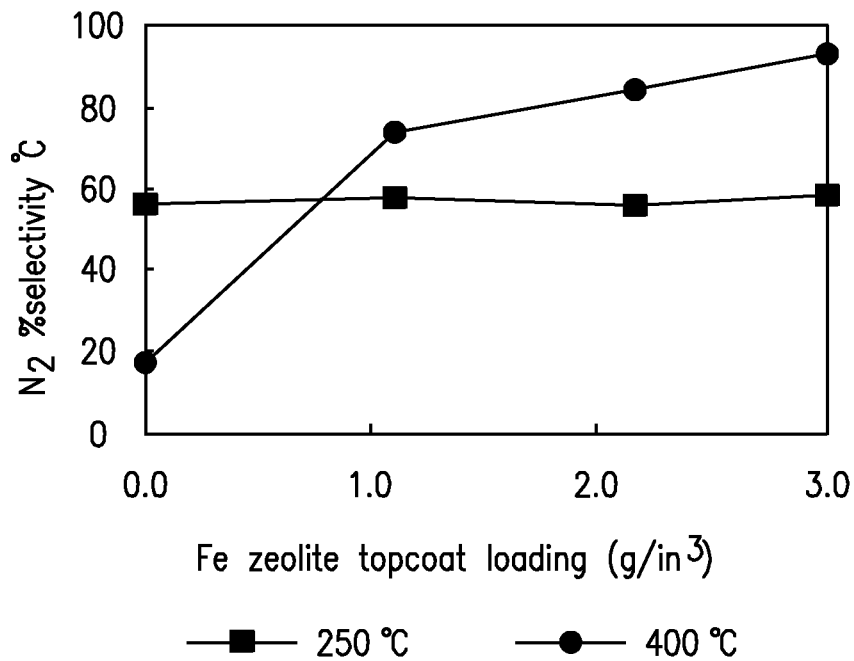
FIG. 6A shows the $N_2$ selectivity for ammonia oxidation for catalysts J-M as a function of the top washcoat loading.
Figure 6B:
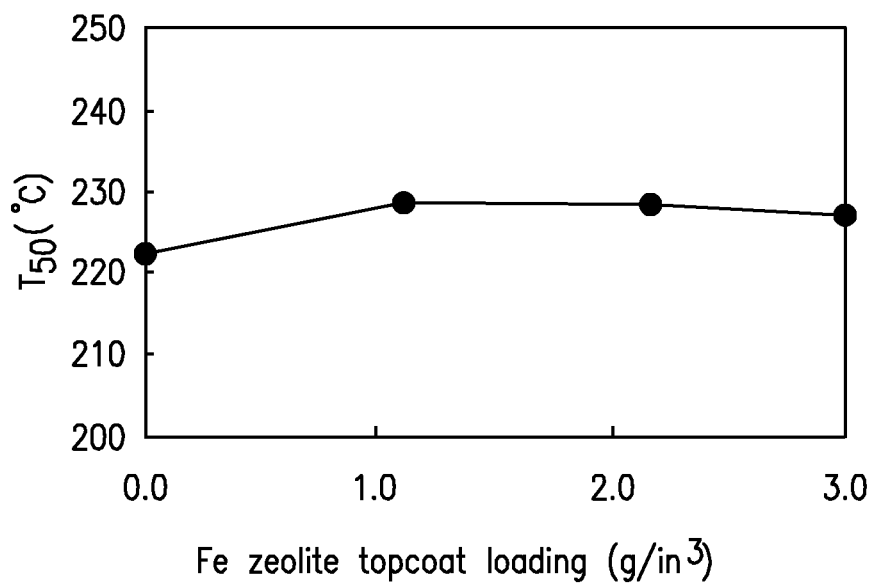
FIG. 6B shows the $NH_3$ lightoff temperature $T_{50}$ for ammonia oxidation for catalysts J-M as a function of the top washcoat loading.

The catalysts 1J-1N in Table 1 were evaluated for $NH_3$ oxidation in a laboratory model gas reactor as described above. FIG. 6A shows the $N_2$ selectivity for catalysts J-M as a function of the top washcoat loading. The $N_2$ selectivity is a function of the FeBEA content, especially at 400° C., but the trend in selectivity as a function of FeBEA loading is less steep than for the CuCHA-based catalysts. The data shows that it takes a considerably higher loading of the FeBEA cocatalyst to achieve the same $N_2$ selectivity as with the CuCHA cocatalyst. At 250° C. the $N_2$ selectivity is essentially invariant as a function of FeBEA loading even up to FeBEA loadings of 3.0 g/in$^3$. The data in FIG. 6B shows that the lightoff temperature $T_{50}$ lies between 220° C. and 230° C. for all of the catalysts 1J-1N with no obvious trend, again indicating no substantial penalty $NH_3$ activity due to the presence of the topcoat.

EXAMPLE 4

Figure 7:
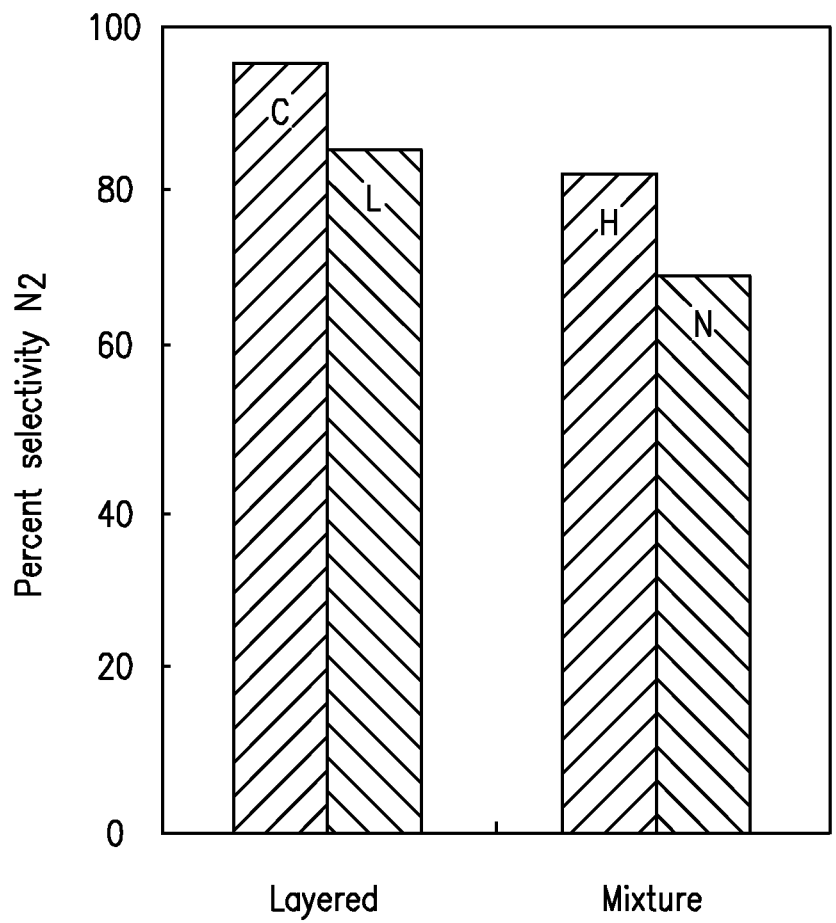
FIG. 7 shows $N_2$ selectivity for ammonia oxidation for layered catalysts C and L, and for uniform catalysts H and N.

FIG. 7 compares the $N_2$-selectivity of aged AMOx catalysts as a function of the catalyst compositional microstructure and as a function of the co-catalyst. Selectivity was evaluated at 400° C. For layered catalysts 1C and 1L, based on CuCHA and FeBEA respectively, the data show that the layered structure, with the supported Pt component in the undercoat layer, gives higher $N_2$ selectivity than the compositionally equivalent uniform catalysts 1H and 1N, in which the supported Pt function is physically mixed with the co-catalyst. Thus there is an advantage to the compositionally layered microstructure over the uniform catalysts in terms of $N_2$ selectivity. FIG. 7 also shows that for either the layered microstructure or the mixed catalyst, the CuCHA co-catalyst gives higher $N_2$ selectivity than the FeBEA co-catalyst. This is a consequence of the much higher activity of the CuCHA material for the SCR reaction, Eq 1.

Figure 8:
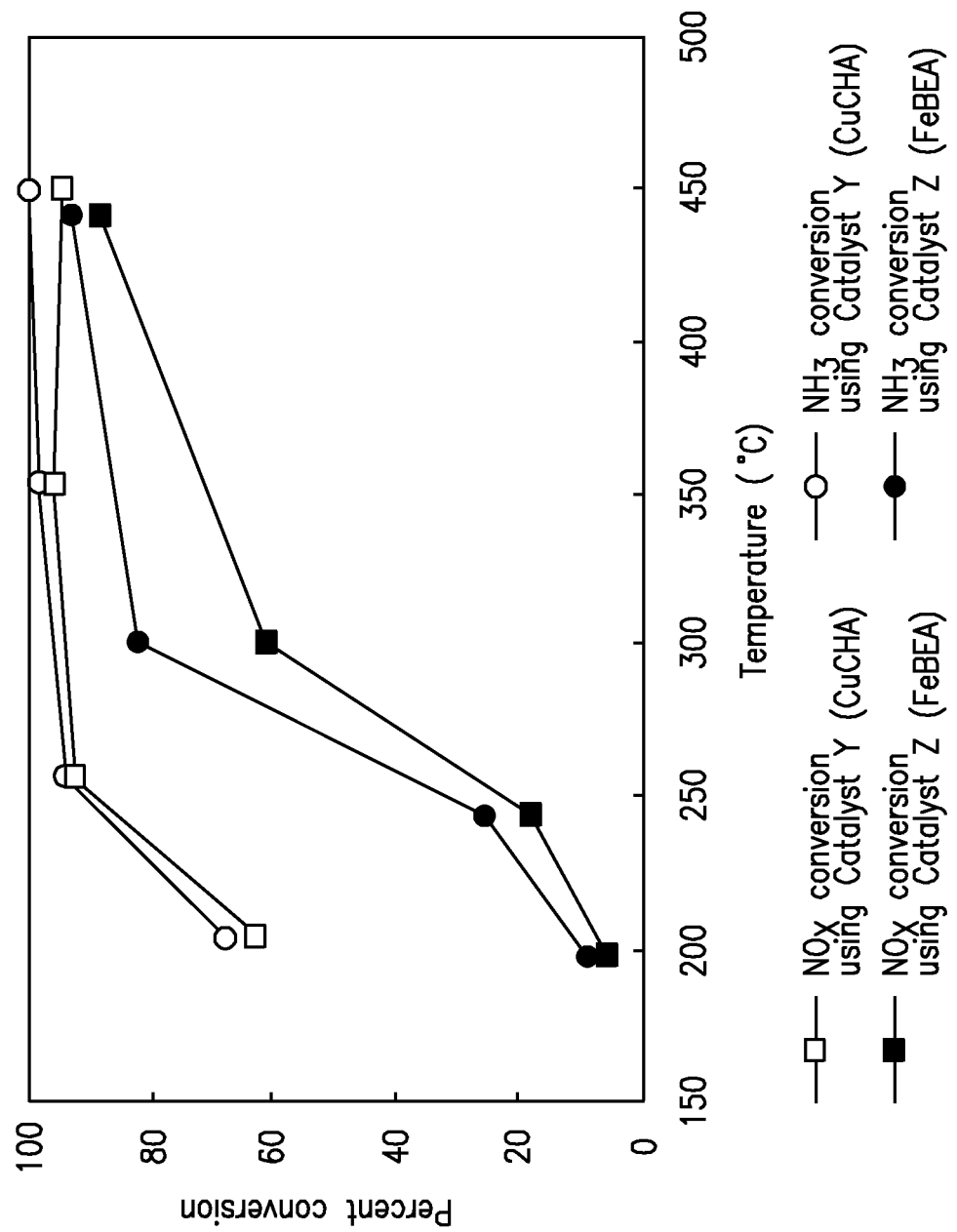
FIG. 8 shows percent conversion of $NO_x$ and $NH_3$ for the SCR reaction as a function of temperature for comparative catalysts Y and Z.

This latter fact is supported by the data in FIG. 8, showing the SCR activity of the comparative catalysts Y (open symbols, 2.6 g/in$^3$ CuCHA, 2.9 wt % Cu) and Z (closed symbols, 3.0 g/in$^3$ FeBEA, 1.5 wt % Fe), which have no Pt on alumina undercoats. The SCR evaluation conditions were: $NH_3$=500 ppm, NO=500 ppm, $O_2$=10% (delivered as air), $H_2O$=5%, balance=$N_2$, GHSV=100,000/hr. Catalysts were aged at 750° C. for 5 hr in 10% $H_2O$/air. This data shows that NO and $NH_3$ conversion for a CuCHA-only catalyst under SCR-relevant conditions is considerably higher than for a comparably-loaded FeBEA-only catalyst. This difference relates directly to the higher reaction rate on the CuCHA co-catalyst, which means that the SCR reaction on the CuCHA co-catalyst is kinetically competitive with the ammonia oxidation rate on the supported Pt component. Under such conditions, NO produced by Eq 2 can be rapidly combined with remaining $NH_3$ to produce $N_2$, thereby increasing net conversion of $NH_3$ to $N_2$.

EXAMPLE 5

Figure 9:
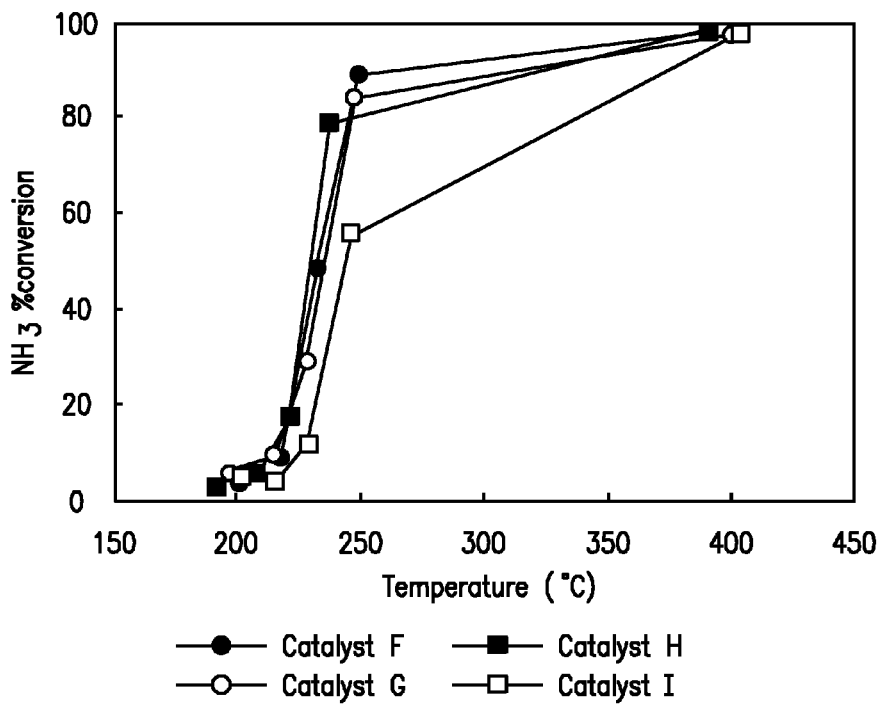
FIG. 9 shows the ammonia percent conversion for ammonia oxidation as a function of temperature for catalysts layered catalysts F-I.

Thermal and hydrothermal stability of layered and mixed CuCHA-based AMOx catalysts were probed under $NH_3$ oxidation conditions, and the data shown in FIG. 9. Catalysts were thermally aged at 750° C. for 5 hr in air (closed symbols) or 750° C. for 5 hr in 10% $H_2O$/air (open symbols). The data show that both the layered catalysts 1F and 1G (round symbols) and uniform catalysts H and I (square symbols) have good stability to thermal aging in air at 750° C. for 5 hr, with no loss in activity relative to the freshly prepared catalysts.

After hydrothermal aging in 10% $H_2O$/air at 750° C. for 5 hr, the data show no loss in activity for the layered catalyst. However, there is a significant loss in activity for the uniform catalyst after hydrothermal aging. These data illustrate the advantage of greater physical separation of the Pt component and the copper-containing component in achieving hydrothermal stability in catalyst mixtures.

PREPARATION OF SAMPLES 1P and 1Q

Figure 10:
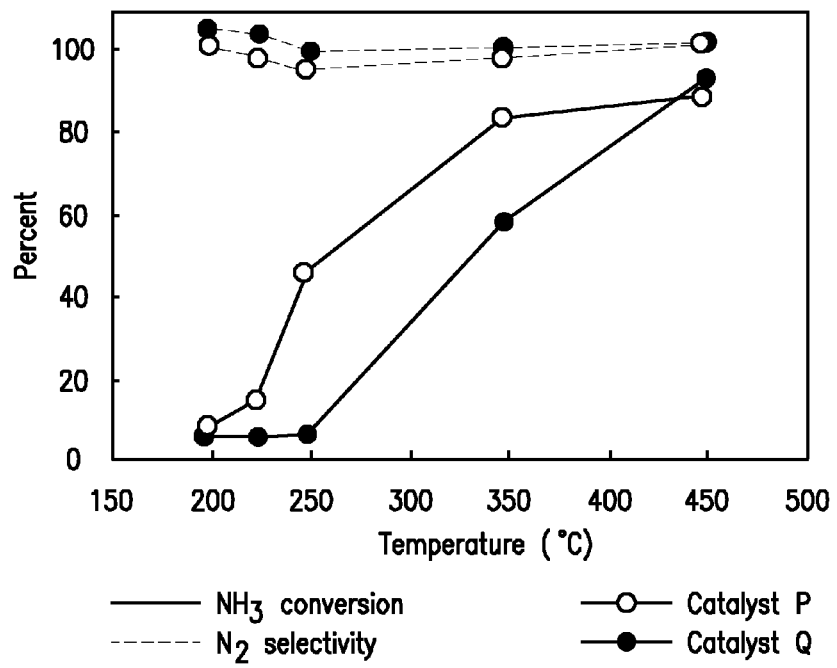
FIG. 10 shows $NH_3$ conversion (solid lines) and $N_2$ selectivity (dashed lines) for ammonia oxidation catalyzed by the integrated SCR+AMOx catalyst P (open symbols) and a comparative SCR-only catalyst Q (closed symbols)

An integrated SCR+AMOx catalyst 1P was produced based on the scheme illustrated in FIG. 2. Briefly, a 1.0 inch OD×6.0 inch long honeycomb monolith substrate having 400 cpsi and 6 mil wall thickness was coated with a slurry containing 0.57 wt % Pt supported on SBA-150, in a 1.25 inch long zone on one end, followed by drying and calcination at 450° C. The slurry preparation process was described above. The target washcoat loading in this zone was 0.5 g/in$^3$, which gives a target Pt loading of 5 g/ft$^3$ in this zone. The resulting part has a Pt on γ-alumina zone at one end as shown in FIG. 2A. This same part was then coated from the opposite end with a slurry containing CuCHA, to give a target loading of CuCHA of 2.5 g/in$^3$ on the entire part, using the slurry preparation and coating process described above. The part was dried and then calcined at 450° C. to affix the CuCHA catalyst to the part. This process gives a part having two zones as shown in FIG. 2b: 1) an SCR-only zone 4.75 inches in length that has only CuCHA at 2.5 g/in$^3$; 2) an AMOx zone 1.25 inches in length that has a 0.5 g/in$^3$ Pt on SBA-150 as an undercoat layer and 2.5 g/in$^3$ CuCHA as a top layer. This part functions as a lab-scale model for an SCR+AMOx catalyst generated by an integrated coating process. A comparative catalyst Q was generated by coating a 1.0 inch OD×6.0 inch long honeycomb monolith substrate with 2.5 g/in$^3$ CuCHA over the entire length of the part, but without having the Pt on γ-alumina undercoat zone. See Table 2 for details of catalyst composition and geometry.

testing of the AMOx-only parts above. The part was evaluated with the AMOx zone placed in the downstream (outlet) position. FIG. 10 shows the $NH_3$ percent conversion and $N_2$ percent selectivity activity of part P as a function of temperature, and overlays these traces against the comparative part Q. The data show that the SCR-only catalyst Q can oxidize ammonia at high temperatures ($T_{50}$=330° C.), but that the $T_{50}$ for $NH_3$ lightoff is moved to approximately 250° C. in the integrated SCR+AMOx catalyst P. In both cases, the $NH_3$ oxidation yields $N_2$ almost exclusively, as shown by $N_2$ selectivities in excess of 90% for all temperatures.

EXAMPLE 7

Figure 11:
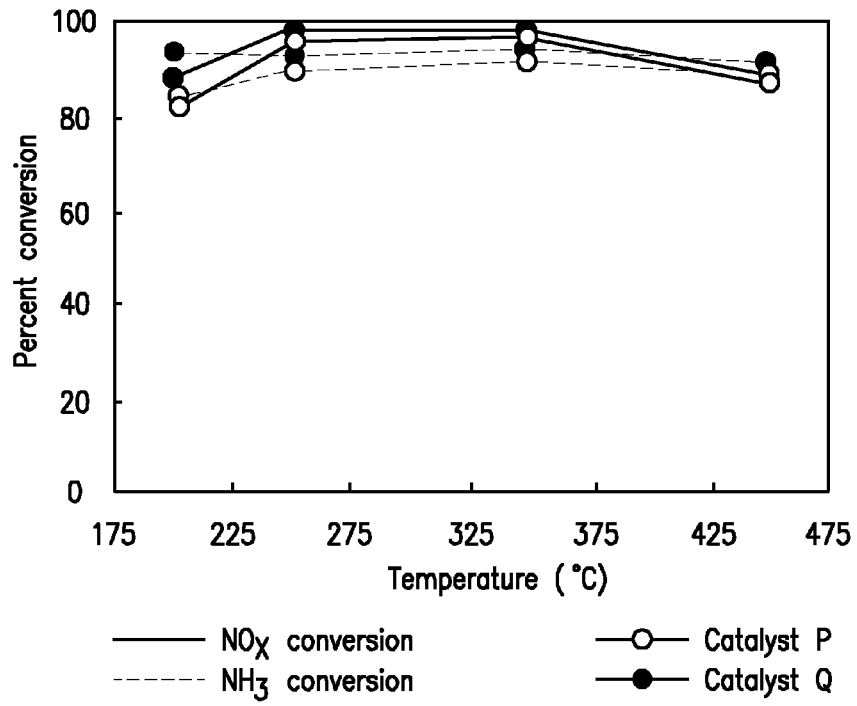
FIG. 11 shows $NO_x$ conversion (solid lines) and $NH_3$ conversion (dashed lines) for the SCR reaction catalyzed by the integrated SCR+AMOx catalyst P (open symbols) and a comparative SCR-only catalyst Q (closed symbols) under conditions where inlet $NH_3/NO=1$.

Catalyst P was evaluated for SCR activity under the following conditions deemed to be relevant in mobile SCR applications: $NH_3$=200 ppm, NO=200 ppm, $O_2$=10% (delivered as house air), $H_2O$=5%, balance=$N_2$, GHSV=80,000/hr. The data in FIG. 11 show that the SCR-only comparative sample Q and the integrated SCR+AMOx catalyst P give essentially equivalent NO conversion and $NH_3$ conversion. This data demonstrates that placing the Pt-containing undercoat on the rear 20% portion of an SCR catalyst does not negatively impact the SCR $NO_x$ conversion of the catalyst system.

EXAMPLE 8

The integrated SCR+AMOx catalyst system was finally evaluated under SCR conditions where $NH_3$ is in excess, in order to evaluate the SCR and AMOx performance simultaneously. The conditions for this evaluation are as follows: NO=200 ppm, $O_2$=10% (delivered as house air), $H_2O$=5%, balance=$N_2$, GHSV=80,000/hr; $NH_3$=200 ppm (T=200° C.), 226 ppm (250° C.), 257 ppm (350° C.), 828 ppm (450° C.).

TABLE 2

Integrated SCR + AMOx catalysts

| | Zone 1 | | Zone 2 | | | | | | $NH_3$ oxidation data | | |
|---|---|---|---|---|---|---|---|---|---|---|---|
| Catalyst[a] | Zone length In | CuCHA[b] load[c] g/in$^3$ | Zone length in | Pt support[c,d] g/in$^3$ | Pt on support wt % (metal) | Total Pt[c] g/ft$^3$ | CuCHA[b] load[c] g/in$^3$ | $NH_3$ conv[e] 250° C. | $N_2$ sel[f] 250° C. | $N_2$ sel[f] 400° C. |
| P | 4.75 | 2.32 | 1.25 | 0.53 | 0.58 | 5.31 | 2.32 | 46 | 96 | 100 |
| Q | 6 | 2.32 | 0 | — | — | — | — | 6.3 | 99 | 100 |

[a]Catalysts in fresh state
[b]2.9% Cu by wt on SSZ-13, SAR = 30
[c]Based on zone length
[d]γ-alumina (SBA-150)
[e]percent $NH_3$ conversion
[f]percent $N_2$ selectivity

EXAMPLE 6

Figure 12:
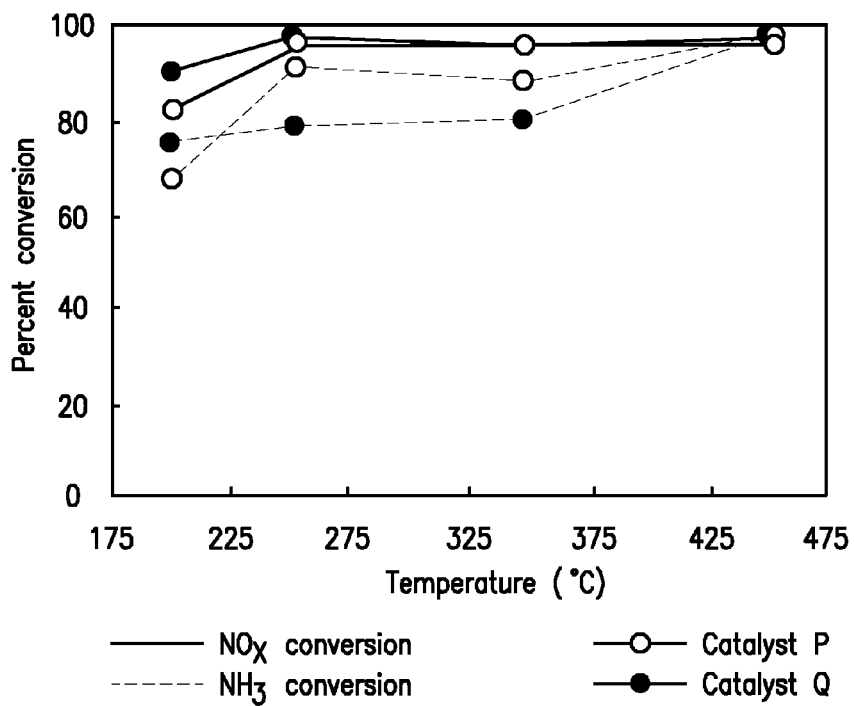
FIG. 12 shows $NO_x$ conversion (solid lines) and $NH_3$ conversion (dashed lines) for the SCR reaction catalyzed by the integrated SCR+AMOx catalyst P (open symbols) and a comparative SCR-only catalyst Q (closed symbols) under conditions where inlet $NH_3/NO>1$.

Catalyst P was evaluated in the fresh state for ammonia oxidation under the following conditions deemed to be relevant for mobile SCR applications: $NH_3$=200 ppm, $O_2$=10% (delivered as house air), $H_2O$=5%, balance=$N_2$, GHSV=80,000/hr. The space velocity was set using the bulk volume of the entire part. It must be recognized that the AMOx zone on this part is only 20% of the total volume, and so the effective space velocity for the AMOx zone is 400,000/hr. As a result we expect the net conversion of $NH_3$ to be lower than in The $NH_3$ levels were chosen for each temperature point in order to give 50 ppm $NH_3$ at the outlet of the control SCR-only catalyst Q. The gas stream was then switched to the integrated SCR+AMOx catalyst P and it was evaluated under the same condition. These data are shown in FIG. 12. Both P and Q give nearly 100% NO conversion at T≧250° C. Catalyst Q gives slightly higher NO conversion at 200° C. In terms of $NH_3$ conversion, it is clear that for temperature up to 350° C., the integrated SCR+AMOx catalyst gives higher $NH_3$ conversion, and hence lower $NH_3$ slip under the conditions of excess ammonia. Due to the efficient oxidation of ammonia by the CuCHA catalyst at 450° C., we were unable to obtain a 50 ppm $NH_3$ slip from the SCR-only comparative catalyst Q at that temperature.

The data in FIGS. 10-12 show that catalyst P achieves three important goals for an integrated SCR+AMOx catalyst: 1) the ammonia oxidizing component oxidizes ammonia in the absence of NO; 2) when placed in the undercoat layer and the rear zone, the ammonia oxidizing component does not negatively impact the SCR $NO_x$ conversion; 3) under relevant SCR conditions with excess $NH_3$, the integrated SCR+AMOx catalyst can simultaneously remove $NO_x$ and excess ammonia. We also showed that the compositionally layered AMOx zone is more stable to hydrothermal aging than a conventional uniform catalyst architecture based on the same composition.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A catalyst system for treating an exhaust gas stream containing NOx, the system comprising:
   at least one monolithic catalyst substrate having an inlet end and an outlet end; an undercoat washcoat layer coated on one the outlet end of the monolithic substrate and which covers less than 100% of the total length of the monolithic substrate, and containing a material composition A effective for catalyzing NH3 oxidation;
   an overcoat washcoat layer coated over a total length of the monolithic substrate from the inlet end to the outlet end sufficient to overlay the undercoat washcoat layer, and containing a material composition B effective to catalyze selective catalytic reduction (SCR) of NOx; and
   wherein material composition A and material composition B are maintained as physically separate catalytic compositions.

2. The catalyst system of claim 1, wherein the monolithic substrate is a flow-through honeycomb substrate comprising a plurality of fine, substantially parallel gas flow passages extending along the longitudinal axis of the substrate.

3. The catalyst system of claim 2, wherein the undercoat washcoat layer covers in the range of about 10% and 40% of the total substrate length, and the overcoat washcoat layer covers in the range of about 5% and 100% of the total substrate length.

4. The catalyst system of claim 2, wherein the substrate is a single monolithic substrate.

5. The catalyst system of claim 2, wherein the undercoat washcoat layer also contains a material composition further effective to catalyze SCR of $NO_x$.

6. The catalyst system of claim 2, wherein the material composition B contains a zeolitic or non-zeolitic molecular sieve.

7. The catalyst system of claim 6, wherein the material composition B contains an aluminosilicate molecular sieve having the one of the crystal framework types FAU, MFI, MOR, and BEA.

8. The catalyst system of claim 6, wherein the material composition B contains an aluminosilicate molecular sieve having a CHA crystal framework type.

9. The catalyst system of claim 6, wherein the material composition B contains a silicoaluminophosphate molecular sieve having the CHA crystal framework type.

10. The catalyst system of claim 6, wherein the molecular sieve contains a metal from one of the groups VB, VIIB, VIIB, VIIIB, IB, or IIB of the periodic table distributed on or within the molecular sieve, the metal being present in an amount between 0.1% and 10% by wt. of the molecular sieve.

11. The catalyst system of claim 10, wherein the metal is selected from Cu, Fe, and mixtures or combinations thereof.

12. The catalyst system of claim 10, wherein the metal is Fe.

13. The catalyst system of claim 10, wherein the metal is Cu.

14. The catalyst system of claim 2, wherein the material composition A comprises a precious metal component dispersed on support particles.

15. The catalyst system of claim 14, wherein the support particles comprise a refractory metal oxide containing alumina, silica, zirconia, titania, ceria, and physical mixtures or chemical combinations thereof, including atomically doped combinations.

16. The catalyst system of claim 14, wherein the precious metal component comprises ruthenium, rhodium, iridium, palladium, platinum, silver, or gold and physical mixtures or chemical combinations thereof, including atomically doped combinations.

17. A catalyst system for treating an exhaust gas stream containing $NO_x$, the system comprising:
   at least one flow-through honeycomb substrate comprising a plurality of fine, substantially parallel gas flow passages extending along the longitudinal axis of the substrate;
   an undercoat washcoat layer coated on the outlet end of the honeycomb substrate, and containing a material composition A comprising a precious metal effective for catalyzing $NH_3$ oxidation;
   an overcoat washcoat layer coated over a total length of the honeycomb substrate from the inlet end to the outlet end of the substrate sufficient to overlay the undercoat washcoat layer, and containing a material composition B free from precious metal effective for catalyzing selective catalytic reduction (SCR) of $NO_x$;
   wherein the undercoat washcoat layer covers in the range of about 10% to about 40% of the total honeycomb substrate length, and wherein material composition A and material composition B are maintained as physically separate catalytic compositions.

* * * * *

UNITED STATES PATENT AND TRADEMARK OFFICE
CERTIFICATE OF CORRECTION

PATENT NO.         : 8,524,185 B2
APPLICATION NO.    : 12/263871
DATED              : September 3, 2013
INVENTOR(S)        : Matthew Tyler Caudle, Martin Dieterle and Scott E. Buzby It is certified that error appears in the above-identified patent and that said Letters Patent is hereby corrected as shown below:

In the Claims:

Claim 1, column 19, line 44, "one" should be removed.

Signed and Sealed this
Twenty-ninth Day of July, 2014

Michelle K. Lee
*Deputy Director of the United States Patent and Trademark Office*